US010830333B2

(12) United States Patent
Poster (10) Patent No.: US 10,830,333 B2
(45) Date of Patent: Nov. 10, 2020

(54) GEARBOX FILLER ASSEMBLY (71) Applicant: Bell Helicopter Textron Inc., Forth Worth, TX (US)

(72) Inventor: Scott David Poster, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 277 days.

(21) Appl. No.: 15/967,935

(22) Filed: May 1, 2018

(65) Prior Publication Data
US 2019/0338844 A1 Nov. 7, 2019

(51) Int. Cl.
*F16H 57/04* (2010.01)
*F16H 57/01* (2012.01)
*B64C 27/12* (2006.01)

(52) U.S. Cl.
CPC ......... *F16H 57/0408* (2013.01); *B64C 27/12* (2013.01); *F16H 57/01* (2013.01); *F16H 2057/012* (2013.01)

(58) Field of Classification Search
CPC ..... B64C 27/12; F16H 57/0408; F16H 57/01; F16H 57/012; F16H 2057/012; G01F 23/04; F01M 11/0458; F01M 2011/0491
USPC ........................................................ 184/1.5
See application file for complete search history.

(56) References Cited

U.S. PATENT DOCUMENTS

| | | | | |
|---|---|---|---|---|
| 1,841,691 A | * | 1/1932 | Wilson | B60K 15/03504 220/371 |
| 3,235,274 A | * | 2/1966 | Cain, Jr. | F16J 15/30 277/500 |
| 4,116,505 A | | 9/1978 | Stahlecker | |
| 4,703,867 A | * | 11/1987 | Schoenhard | F01M 11/04 141/331 |
| 5,014,445 A | * | 5/1991 | Martell | F16H 57/0408 33/731 |

(Continued)

FOREIGN PATENT DOCUMENTS

| | | |
|---|---|---|
| EP | 1739011 A1 | 1/2007 |
| EP | 2505878 A1 | 10/2012 |
| WO | 2016140731 A1 | 9/2016 |

OTHER PUBLICATIONS

European Patent Office, European Search Report for EP Appl. No. 18181815.4 dated Jan. 31, 2019, 8 pp.

(Continued)

*Primary Examiner* — Michael R Mansen
*Assistant Examiner* — Mark K Buse
(74) *Attorney, Agent, or Firm* — Edwin S. Flores; Daniel J. Chalker; Chalker Flores, LLP (57) ABSTRACT A gearbox filler assembly includes a cylindrical insert attached to an interior of a port disposed within a housing of the gearbox. The cylindrical insert has a first end disposed within the port, a second end extending outward from the port and is configured to receive a detachable filler cap, a retaining lip around at least a portion of a first interior circumference proximate to the first end, and a retaining slot around at least a second interior circumference between the retaining lip and the second end. A retaining ring is detachably coupled within the retaining slot. A cylindrical baffle is detachably retained between the retaining ring and the retaining lip.

17 Claims, 6 Drawing Sheets

(56) References Cited

U.S. PATENT DOCUMENTS

| | | | | |
|---|---|---|---|---|
| 5,086,943 | A * | 2/1992 | Poskie | B65D 51/1622 |
| | | | | 220/303 |
| 5,634,502 | A * | 6/1997 | Pierce | F01M 11/04 |
| | | | | 141/331 |
| 6,405,747 | B1 * | 6/2002 | King | B60K 15/03519 |
| | | | | 137/202 |
| 8,875,754 | B2 * | 11/2014 | Eyre | B67D 7/565 |
| | | | | 141/338 |
| 2002/0112907 | A1 * | 8/2002 | Maeda | B62J 35/00 |
| | | | | 180/69.4 |
| 2012/0017722 | A1 * | 1/2012 | Bell | F16H 57/0452 |
| | | | | 74/606 R |
| 2015/0362024 | A1 | 12/2015 | Shimazaki et al. | |
| 2016/0040721 | A1 * | 2/2016 | Kice | F16J 15/54 |
| | | | | 384/480 |
| 2018/0051793 | A1 * | 2/2018 | Ture | F16N 29/00 |

OTHER PUBLICATIONS

Bell Helicopter, Flight International "Bell 525 Relentless" Nov. 12, 2014.

Perry, Dominic "Analysis: Bell 525 Relentless cutaway and technical Description" https://www.flightglobal.com/news/articles/analysis-bell-525-relentless-cutaway-and-technical-4055411, Source: Bell Helicopter,Flight International, London, Nov. 12, 2014, 8 pages.

* cited by examiner

GEARBOX FILLER ASSEMBLY

CROSS-REFERENCE TO RELATED APPLICATIONS

This patent application is related to U.S. provisional patent application Ser. No. 62/399,067 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which is hereby incorporated by reference in its entirety.

STATEMENT OF FEDERALLY FUNDED RESEARCH

Not applicable.

TECHNICAL FIELD OF THE INVENTION

The present invention relates in general to the field of lubricant filling ports, and more particularly, to a gearbox filler assembly for use in an aircraft, for example, a rotorcraft.

BACKGROUND OF THE INVENTION

Without limiting the scope of the invention, its background is described in connection with rotorcraft having gearbox filling ports.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission, causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

Thus, a need remains for improving the overall safety and reliability of rotorcraft drive systems that include the connections between the engines and the main rotor gearbox, reduction and accessory gearboxes, shafts, generators, oil pumps, and accessories connected to the main rotor gearbox. Specifically, systems and methods that minimize the number of single load path components, provide maximum system separation and redundancy, minimize maintenance required and maintenance related incidents, minimize the potential of loss of lubrication events, and maximize main rotor gearbox loss of lubrication capability are desirable, including systems and methods for cooling components and systems during normal operations and during loss of lubrication events.

SUMMARY OF THE INVENTION

In one embodiment, the present invention includes a filler assembly for a gearbox, comprising: a cylindrical insert attached to an interior of a port disposed within a housing of the gearbox, the cylindrical insert having a first end disposed within the port, a second end extending outward from the port and configured to receive a detachable filler cap, a retaining lip around at least a portion of a first interior circumference proximate to the first end, and a retaining slot around at least a second interior circumference between the retaining lip and the second end; a retaining ring is detachably coupled within the retaining slot; and a cylindrical baffle is detachably retained between the retaining ring and the retaining lip. In one aspect, the port is positioned or oriented such that one or more gears or portions thereof within the gearbox are visible via the port. In another aspect, the cylindrical baffle comprises: a first end having two or more first openings; a second end having two or more second openings; and wherein each first opening is offset from the second openings, and one or more passageways connect the first openings to the second openings. In another aspect, the first openings and the second openings are sized and positioned to allow a lubricant to flow into the gearbox and prevent large amounts of the lubricant from splashing out of the gearbox. In another aspect, the cylindrical baffle comprises: a first disk having two or more first openings; a second disk having two or more second openings; the first openings are offset from the second openings; and the second disk is attached to the first disk such that a gap is formed between one or more portions of the first disk and the second disk, and the gap connects the first openings to the second openings. In another aspect, the gearbox is a main rotor gearbox, a tail rotor gearbox, an intermediate gearbox, an accessory gearbox, or a reduction gearbox. In another aspect, the filler cap is detachably secured to the second end of the cylindrical insert. In another aspect, the cylindrical insert is formed as part of the housing.

In another embodiment, the present invention includes a method for managing a lubricant in a gearbox, comprising: providing a gearbox having a housing, a port disposed within the housing and a filler assembly; the filler assembly comprises a cylindrical insert attached to an interior of the port, the cylindrical insert having a first end disposed within the port, a second end extending outward from the port and configured to receive a detachable filler cap, a retaining lip around at least a portion of a first interior circumference proximate to the first end, a retaining slot around at least a second interior circumference between the retaining lip and the second end, a retaining ring is detachably coupled within the retaining slot, and a cylindrical baffle is detachably retained between the retaining ring and the retaining lip; adding a lubricant to the gearbox via the port without removing the baffle; and preventing large amounts of the lubricant from splashing out of the gearbox using the baffle. In one aspect, the method further comprising: removing the detachable filler cap; removing the retaining ring and the baffle; and visually inspecting one or more gear teeth within the gearbox via the port. In another aspect, the cylindrical baffle comprises: a first end having two or more first openings; a second end having two or more second openings; and wherein each first opening is offset from the second openings, and one or more passageways connect the first openings to the second openings. In another aspect, the first openings and the second openings are sized and positioned to allow a lubricant to flow into the gearbox and prevent large amounts the lubricant from splashing out of the gearbox. In another aspect, the cylindrical baffle comprises: a first disk having two or more first openings; and a second disk having two or more second openings, the second disk attached to the first disk such that a gap is formed between one or more portions of the first disk and the second disk, and the gap connects the first openings to the second openings.

In another embodiment, the present invention includes a rotorcraft, comprising: a fuselage; a gearbox disposed within the fuselage, the gearbox having a housing and a port disposed within the housing; a cylindrical insert attached to an interior of the port, the cylindrical insert having a first end disposed within the port, a second end extending outward from the port and configured to receive a detachable filler cap, a retaining lip around at least a portion of a first interior circumference proximate to the first end, and a retaining slot around at least a second interior circumference between the retaining lip and the second end; a retaining ring configured to be detachably coupled within the retaining slot; and a cylindrical baffle configured to be detachably retained between the retaining ring and the retaining lip. In one aspect, the port is positioned or oriented such that one or more gear teeth within the gearbox are visible via the port. In another aspect, the cylindrical baffle comprises: a first end having two or more first openings; a second end having two or more second openings; and wherein each first opening is offset from the second openings, and one or more passageways connect the first openings to the second openings. In another aspect, the first openings and the second openings are sized and positioned to allow a lubricant to flow into the gearbox and prevent large amounts the lubricant from splashing out of the gearbox. In another aspect, the cylindrical baffle comprises: a first disk having two or more first openings; and a second disk having two or more second openings, the second disk attached to the first disk such that a gap is formed between one or more portions of the first disk and the second disk, and the gap connects the first openings to the second openings. In another aspect, the gearbox is a main rotor gearbox, a tail rotor gearbox, an intermediate gearbox, an accessory gearbox, or a reduction gearbox. In another aspect, the filler cap is detachably secured to the second end of the cylindrical insert.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As will be described in more detail below, a filler port is positioned and oriented to serve as a visual inspection port for one or more gears within the gearbox. A detachable baffle allows lubricant to be added to the gearbox but prevents large amounts of lubricant from exiting the gearbox if the filler cap is not present.

Figure 1:
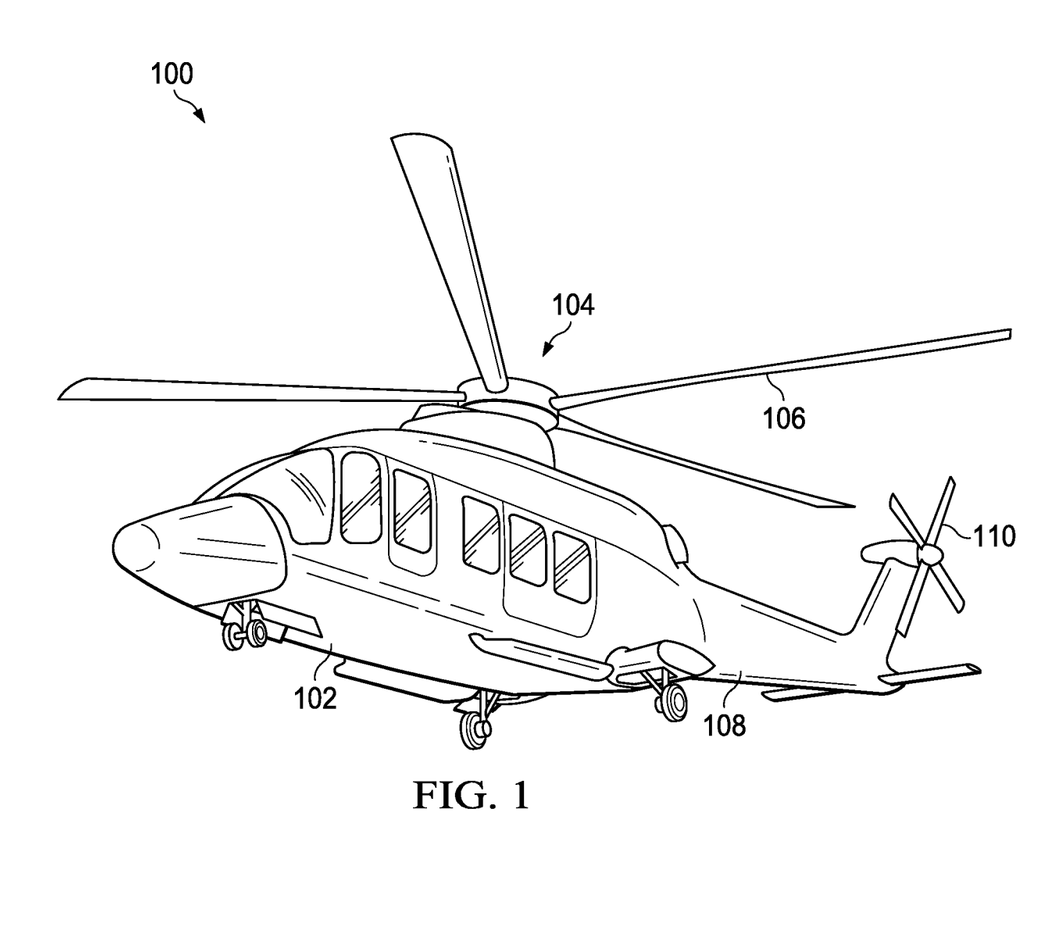
FIG. 1 shows a side view of a helicopter according to an embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
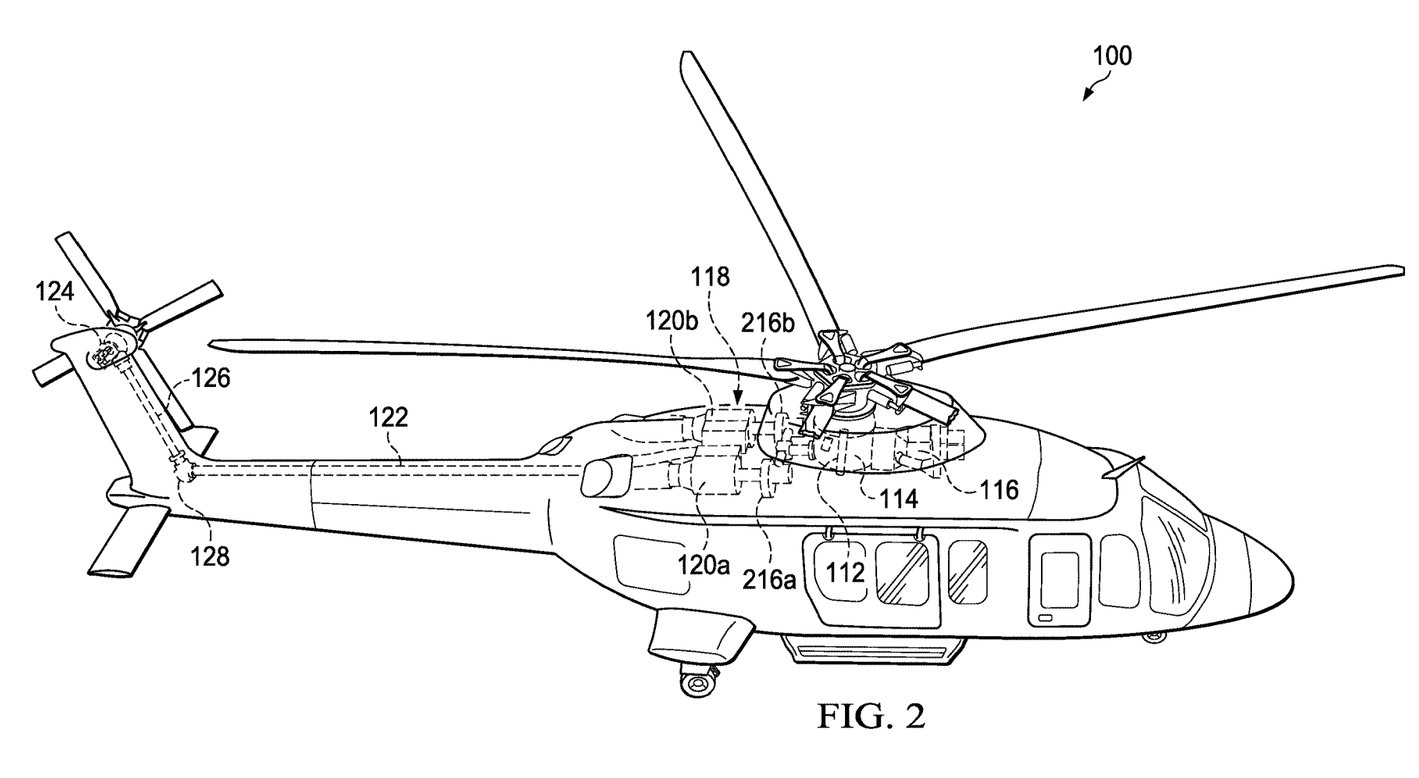
FIG. 2 shows a partial cross-section, perspective view of a helicopter according to an embodiment of the present application.

For example, FIG. 2 shows a partial cross-section perspective view of aircraft 100 that includes additional detail of the present invention. Aircraft 100 further includes a main rotor mast 112, which is connected to the main rotor gearbox (MRGB) 114. The MRGB 114 is connected to one or more accessory gear boxes 116, one or more reduction gearboxes (RGB) 216a, 216b, hydraulic pump(s) and generator(s). Each RGB 216a, 216b is connected to one or more engines 120a, 120b, which are within an engine compartment 118. A tail rotor drive shaft 122 transmits mechanical rotation to the tail rotor gearbox 124, which is connected via tail rotor drive shaft 126 and intermediate gear box 128.

The drive system and subcomponents of aircraft 100 were developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

The drive system and subcomponents of aircraft 100 overcome many drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

High-speed gearing and the associated heat generation is always an area of concern for gearbox survivability. The ability to continue torque transmission, particularly in a loss of lubrication scenario, is of great importance. For this reason, the drive system includes two separate RGB's, each one connected to a separate engine and independent from the MRGB. The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM prior to transmitting torque to the MRGB. Each RGB has its own self-contained lubrication system consisting of pump, filter, oil monitoring sensors, and a unique core in the aircraft cooler assembly. With this drive system arrangement high-speed gearing is contained in separate gearboxes, as such, the survivability of the total drive system is greatly enhanced, particularly in the event of high-speed gear failure or loss of lubricant in an individual RGB. The use of independent RGBs that connect to a single low speed overhung planetary gear system in the MRGB reduces rotating part count and heat generation. With maintenance in mind, the drive system allows for a short mast top case assembly that allows swapping of the top case and mast without removal of the main rotor gearbox from the aircraft. The MRGB also includes a clutch for each of the reduction gearboxes that allows each reduction gearbox to be separately and independently disconnected from the MRGB.

The drive system of aircraft 100 can also take advantage of a number of additional features that minimize the possibility of loss of lubricant and to maximize the operational time if a loss of lubricant event does occur. For example, the drive system can also include one or more of the following: (1) the use of transfer tubes for cooler and filter mounting to eliminate the loss of lubricant in the event of loss of attachment fastener torque; (2) using an oil cooler mounted directly to the MRGB eliminating external hoses; (3) the use of all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque carrying components maximizing their continued operation in the event of a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

Figure 3:
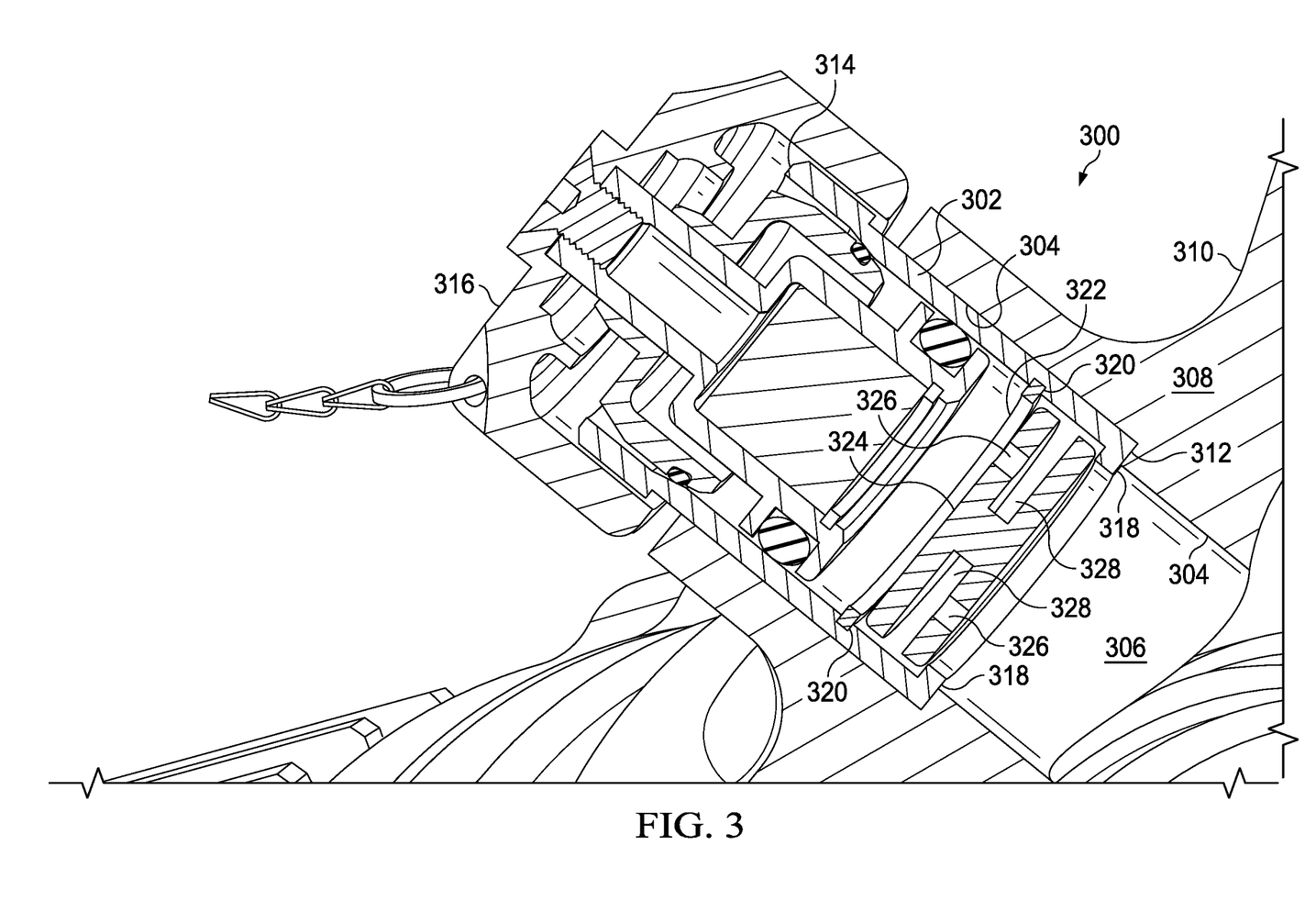
FIG. 3 shows a cross section of a gearbox filler assembly according to an embodiment of the present application.

FIG. 3 shows a cross section of a gearbox filler assembly 300 according to an embodiment of the present application. Gearbox filler assembly 300 includes a cylindrical insert 302 attached to an interior wall 304 of a port 306 disposed within a housing 308 of the gearbox 310. The cylindrical insert 302 has a first end 312 disposed within the port 306, a second end 314 extending outward from the port 306 and configured to receive a detachable filler cap 316, a retaining lip 318 around at least a portion of a first interior circumference proximate to the first end 312, and a retaining slot 320 around at least a second interior circumference between the retaining lip 318 and the second end 314. A retaining ring 322 is detachably coupled within the retaining slot 320. A cylindrical baffle 324 is detachably retained between the retaining ring 322 and the retaining lip 318. The filler cap 316 is detachably secured to the second end 314 of the cylindrical insert 302.

Note that the cylindrical insert 302 can be formed as part of the housing 308 such that they form one piece. In other words, the interior of the cylindrical insert 302 is the interior wall 304 of the port 306, the retaining lip 318 extends into the interior wall 304 of the port 306, and the retaining slot 320 is formed into the interior wall 304 of the port 306. In addition, the port 306 can be positioned or oriented such that one or more gears or portions thereof within the gearbox 310 are visible via the port 306 when the cap 316 and cylindrical baffle 324 are removed. Moreover, the positioning of the retaining lip 318, cylindrical baffle 324, retaining ring 322 can vary and do not have to be located at the first end 312 of the cylindrical insert 302. The gearbox 310 can be main rotor gearbox, a tail rotor gearbox, an intermediate gearbox, an accessory gearbox, a reduction gearbox, or other type of gearbox. The skilled artisan will recognize that the specific arrangement of the embodiment in FIG. 3 is exemplary and that other embodiments of the present invention that serve the same purposes are possible, given specific requirements and applications.

Note also that the design of cylindrical baffle 324 is not limited to the embodiments shown in the figures as long as the cylindrical baffle 324 includes openings 326 and passageways or gaps 328 that are sized and positioned to allow a lubricant to flow into the gearbox 310 and prevent large amounts of the lubricant from splashing out of the gearbox 310. For example, the cylindrical baffle 324 can have a first end having two or more first openings, and a second end having two or more second openings. Each first opening is offset from the second openings, and one or more passageways connect the first openings to the second openings. Moreover, the first openings and the second openings are sized and positioned to allow a lubricant to flow into the gearbox and prevent large amounts of the lubricant from splashing out of the gearbox.

Figure 4:
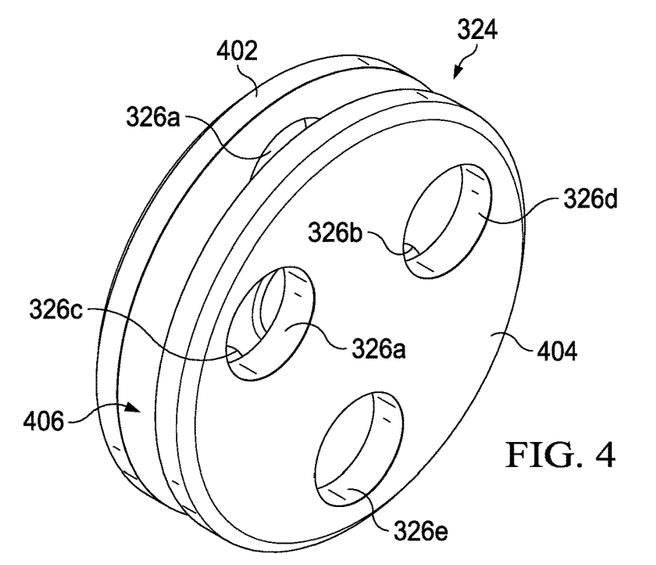
FIG. 4 depicts a cylindrical baffle according to an embodiment of the present application.

FIG. 4 depicts a cylindrical baffle 324 according to an embodiment of the present application. Cylindrical baffle 324 has a first disk 402 having two or more first openings 326a, 326b and 326c, and a second disk 404 having two or more second openings 326d, 326e and 326f. The first openings 326a, 326b and 326c are offset from the second openings 326d, 326e and 326f. The second disk 404 is attached to the first disk 402 such that a gap 406 is formed between one or more portions of the first disk 402 and the second disk 404. The gap 406 connects the first openings 326a, 326b and 326c to the second openings 326d, 326e and 326f. The first openings 326a, 326b and 326c, the second openings 326d, 326e and 326f, and the gap 406 are sized and positioned to allow a lubricant to flow into the gearbox 310 and prevent large amounts of the lubricant from splashing out of the gearbox 310 during operation. Thus, if filler cap 316 is removed from the cylindrical insert 302 or port 306 and but not replaced before the gearbox 310 is operated, the cylindrical baffle 324 prevents extensive lubricant loss through port 306.

Figure 5:
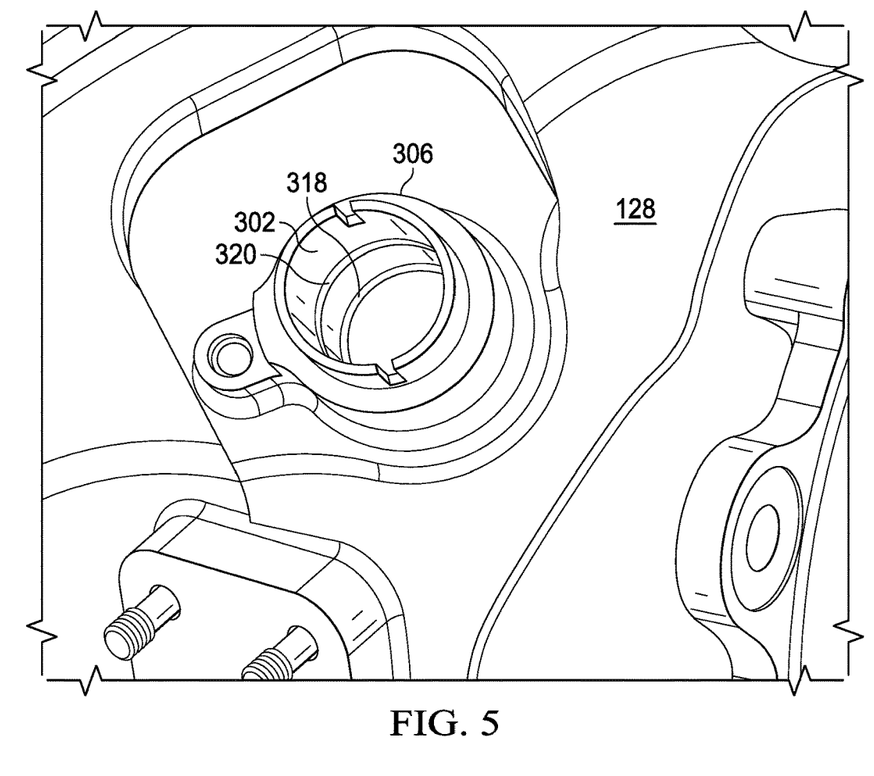
FIG. 5 illustrates an external view of a gearbox and port according to an embodiment of the present application.
Figure 6:
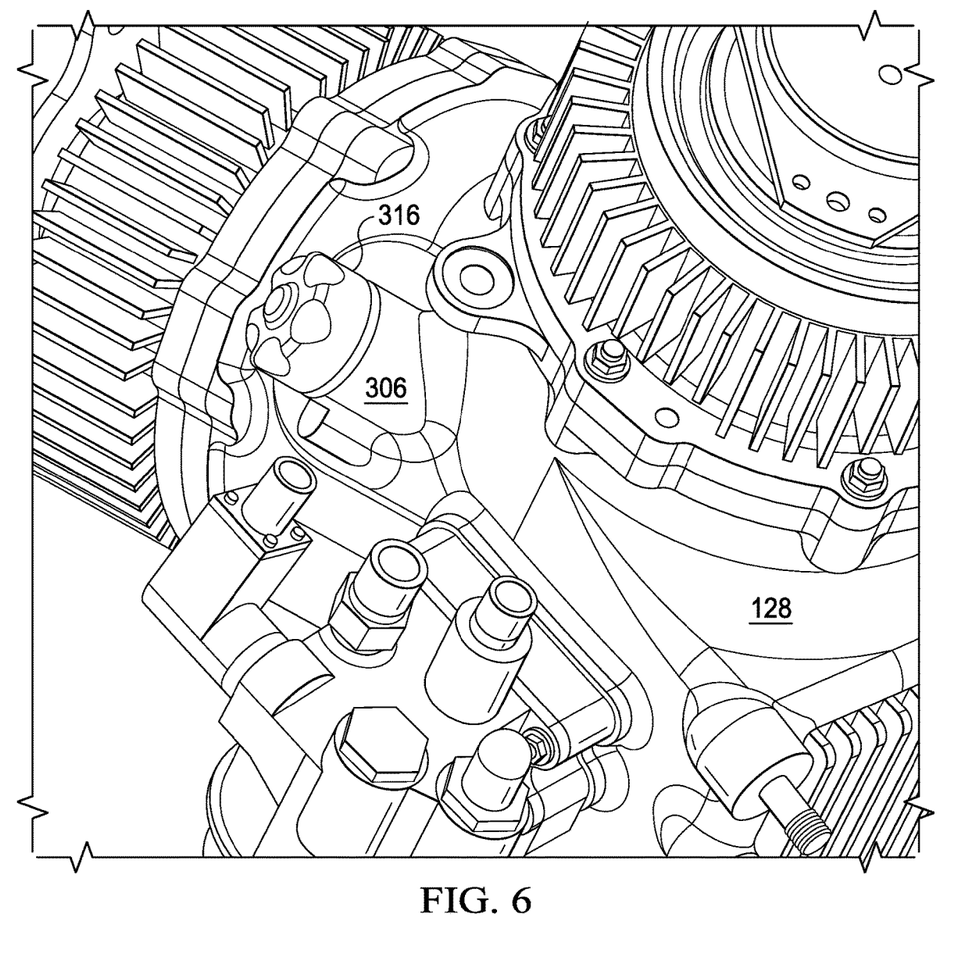
FIG. 6 illustrates another external view of a gearbox according to an embodiment of the present application.

FIGS. 5 and 6 depict external views of an intermediate gearbox 128 and port 306 according to an embodiment of the present application. As shown in FIG. 2, the intermediate gearbox 128 is disposed within a tail fuselage of a helicopter 100 and transmits mechanical rotation from the tail rotor drive shaft 122 to the tail rotor drive shaft 126. In FIG. 5, the filler cap 316 is not present and not shown, permitting a view of the interior of cylindrical insert 302 within the port 306. The retaining lip 318 and retaining slot 320 can also been seen. Filler port 306 is positioned and oriented in intermediate gearbox 128 to permit a visual inspection of one or more gears (not shown) within intermediate gearbox 128 when filler cap 316 (see FIG. 3) and cylindrical baffle 324 (see FIGS. 3 and 4) are removed. In FIG. 6, the filler cap 316 is shown. The intermediate gearbox 128 is a non-limiting example of the present invention. The present invention is applicable to any type of gearbox.

Figure 7:
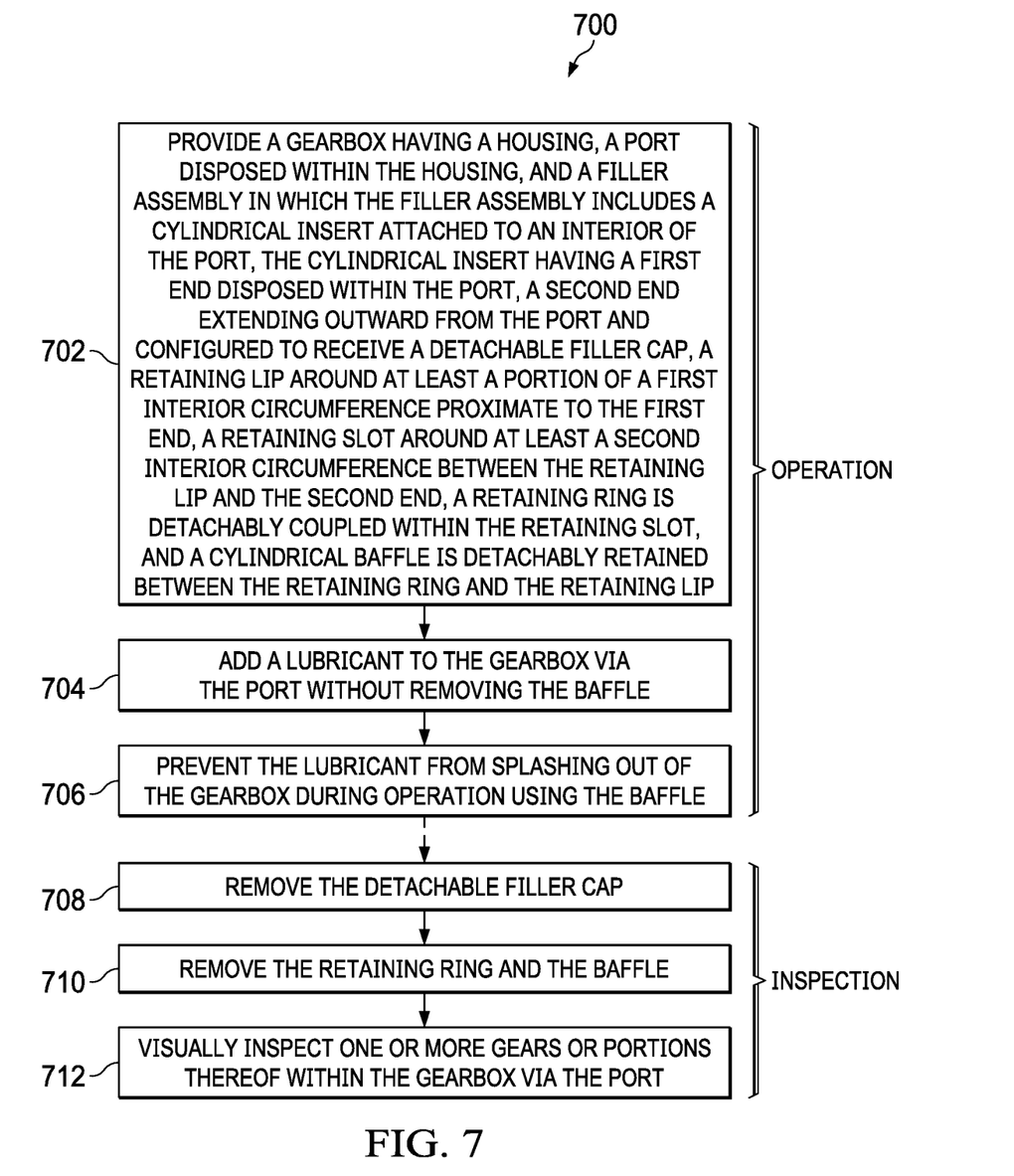
FIG. 7 illustrates a flowchart of a method for managing lubricant in a gearbox according to an embodiment of the present application.

FIG. 7 illustrates a flowchart of a method 700 for managing lubricant in a gearbox according to an embodiment of the present application. Blocks 702-706 depict operational steps, and blocks 708-712 depict inspection steps. A gearbox having a housing, a port disposed within the housing, and a filler assembly are provided in block 702. The filler assembly includes a cylindrical insert attached to an interior of the port, the cylindrical insert having a first end disposed within the port, a second end extending outward from the port and configured to receive a detachable filler cap, a retaining lip around at least a portion of a first interior circumference proximate to the first end, a retaining slot around at least a second interior circumference between the retaining lip and the second end, a retaining ring is detachably coupled within the retaining slot, and a cylindrical baffle is detachably retained between the retaining ring and the retaining lip. A lubricant is added to the gearbox via the port without removing the baffle in block 704. Large amounts of lubricant are prevented from splashing out of the gearbox during operation using the baffle in block 706, even when the detached filler cap is not present or improperly sealed.

The present invention can also be used to inspect the gearbox. The detachable filler cap is removed in block 708. The retaining ring and the baffle are removed in block 710. One or more gears or portions thereof within the gearbox are visually inspected via the port in block 712 when the port is positioned or oriented such that one or more gears or portions thereof within the gearbox are visible via the port.

The skilled artisan will recognize that intermediate gearbox 128, including port 306, filler assembly 300 and cylindrical baffle 324, and method 700, provide effective systems and methods for managing lubricant in a gearbox such as intermediate gearbox 128, and that such systems and methods are useful in preventing a loss of lubrication event. The skilled artisan will also recognize that embodiments of the present invention may be used in conjunction with or may include a variety of gearboxes such as a main rotor gearbox, a tail rotor gearbox, an intermediate gearbox, an accessory gearbox, or a reduction gearbox.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A filler assembly for a gearbox, comprising:
   a cylindrical insert attached to an interior of a port disposed within a housing of the gearbox, the cylindrical insert having a first end disposed within the port, a second end extending outward from the port and configured to receive a detachable filler cap, a retaining lip around at least a portion of a first interior circumference proximate to the first end, and a retaining slot around at least a second interior circumference between the retaining lip and the second end;
   a retaining ring is detachably coupled within the retaining slot; and
   a cylindrical baffle is detachably retained between the retaining ring and the retaining lip, wherein the cylindrical baffle comprises:
   a first end having two or more first openings;
   a second end having two or more second openings; and
   wherein each first opening is offset from the second openings, and one or more passageways connect the first openings to the second openings.

2. The filler assembly of claim 1, wherein the port is positioned or oriented such that one or more gears or portions thereof within the gearbox are visible via the port.

3. The filler assembly of claim 1, wherein the first openings and the second openings are sized and positioned to allow a lubricant to flow into the gearbox and prevent large amounts of the lubricant from splashing out of the gearbox.

4. The filler assembly of claim 1, wherein the cylindrical baffle comprises:
   a first disk having two or more first openings;
   a second disk having two or more second openings;
   the first openings are offset from the second openings; and
   the second disk is attached to the first disk such that a gap is formed between one or more portions of the first disk and the second disk, and the gap connects the first openings to the second openings.

5. The filler assembly of claim 1, wherein the gearbox is a main rotor gearbox, a tail rotor gearbox, an intermediate gearbox, an accessory gearbox, or a reduction gearbox.

6. The filler assembly of claim 1, further comprising the filler cap detachably secured to the second end of the cylindrical insert.

7. The filler assembly of claim 1, wherein the cylindrical insert is formed as part of the housing.

8. A method for managing a lubricant in a gearbox, comprising:
   providing a gearbox having a housing, a port disposed within the housing and a filler assembly;
   the filler assembly comprises a cylindrical insert attached to an interior of the port, the cylindrical insert having a first end disposed within the port, a second end extending outward from the port and configured to receive a detachable filler cap, a retaining lip around at least a portion of a first interior circumference proximate to the first end, a retaining slot around at least a second interior circumference between the retaining lip and the second end, a retaining ring is detachably coupled within the retaining slot, and a cylindrical baffle is detachably retained between the retaining ring and the retaining lip, wherein the cylindrical baffle comprises:
   a first end having two or more first openings;
   a second end having two or more second openings; and
   wherein each first opening is offset from the second openings, and one or more passageways connect the first openings to the second openings;
   adding a lubricant to the gearbox via the port without removing the cylindrical baffle; and
   preventing large amounts of the lubricant from splashing out of the gearbox using the cylindrical baffle.

9. The method of claim 8, further comprising:
   removing the detachable filler cap;
   removing the retaining ring and the baffle; and
   visually inspecting one or more gear teeth within the gearbox via the port.

10. The method of claim 8, wherein the first openings and the second openings are sized and positioned to allow a lubricant to flow into the gearbox and prevent large amounts the lubricant from splashing out of the gearbox.

11. The method of claim 8, wherein the cylindrical baffle comprises:
    a first disk having two or more first openings; and
    a second disk having two or more second openings, the second disk attached to the first disk such that a gap is formed between one or more portions of the first disk and the second disk, and the gap connects the first openings to the second openings.

12. A rotorcraft, comprising:
    a fuselage;

a gearbox disposed within the fuselage, the gearbox having a housing and a port disposed within the housing;

a cylindrical insert attached to an interior of the port, the cylindrical insert having a first end disposed within the port, a second end extending outward from the port and configured to receive a detachable filler cap, a retaining lip around at least a portion of a first interior circumference proximate to the first end, and a retaining slot around at least a second interior circumference between the retaining lip and the second end;

a retaining ring configured to be detachably coupled within the retaining slot; and a cylindrical baffle configured to be detachably retained between the retaining ring and the retaining lip, wherein the cylindrical baffle comprises:
 a first end having two or more first openings;
 a second end having two or more second openings; and
wherein each first opening is offset from the second openings, and one or more passageways connect the first openings to the second openings.

13. The rotorcraft of claim 12, wherein the port is positioned or oriented such that one or more gear teeth within the gearbox are visible via the port.

14. The rotorcraft of claim 12, wherein the first openings and the second openings are sized and positioned to allow a lubricant to flow into the gearbox and prevent large amounts the lubricant from splashing out of the gearbox.

15. The rotorcraft of claim 12, wherein the cylindrical baffle comprises:
 a first disk having two or more first openings; and
 a second disk having two or more second openings, the second disk attached to the first disk such that a gap is formed between one or more portions of the first disk and the second disk, and the gap connects the first openings to the second openings.

16. The rotorcraft of claim 12, wherein the gearbox is a main rotor gearbox, a tail rotor gearbox, an intermediate gearbox, an accessory gearbox, or a reduction gearbox.

17. The rotorcraft of claim 12, further comprising the filler cap detachably secured to the second end of the cylindrical insert.

* * * * *